US009558101B2

(12) United States Patent
Galvin (10) Patent No.: US 9,558,101 B2
(45) Date of Patent: Jan. 31, 2017

(54) PREPROCESSOR DIRECTIVE SYMBOL ANALYZER DEVICES AND METHODS (71) Applicant: Raytheon Company, Waltham, MA (US)

(72) Inventor: David S. Galvin, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 99 days.

(21) Appl. No.: 14/455,328

(22) Filed: Aug. 8, 2014

(65) Prior Publication Data

US 2016/0041895 A1 Feb. 11, 2016

(51) Int. Cl.
*G06F 9/44* (2006.01)
*G06F 11/36* (2006.01)
*G06F 17/27* (2006.01)
*G06F 9/45* (2006.01)

(52) U.S. Cl.
CPC .......... *G06F 11/3644* (2013.01); *G06F 8/423* (2013.01); *G06F 17/2735* (2013.01)

(58) Field of Classification Search
CPC ........ G06F 8/433; G06F 11/3644; G06F 8/42; G06F 8/423; G06F 8/425; G06F 8/427; G06F 8/437; G06F 17/27; G06F 17/273; G06F 17/2735; G06F 17/277
USPC ........................................................ 717/124
See application file for complete search history.

(56) References Cited

U.S. PATENT DOCUMENTS

| 5,649,222 | A | * | 7/1997 | Mogilevsky | .......... | G06F 17/273 |
| | | | | | | 715/257 |
| 6,425,118 | B1 | * | 7/2002 | Molloy | ..................... | G06F 8/51 |
| | | | | | | 717/136 |
| 6,802,059 | B1 | * | 10/2004 | Lyapustina | ............. | G06F 8/425 |
| | | | | | | 717/112 |
| 7,150,010 | B1 | * | 12/2006 | Ringseth | ................. | G06F 8/315 |
| | | | | | | 717/140 |
| 7,484,205 | B2 | | 1/2009 | Venkatapathy | | |
| 7,624,385 | B2 | * | 11/2009 | Waddington | .............. | G06F 8/51 |
| | | | | | | 717/141 |

(Continued)

OTHER PUBLICATIONS

Beider, Alexander and Morse, Stephen P., "Bieder-Morse Phonetic Matching: An Alternative to Soundex with Fewer False Hits," 2008, last retrieved from http://stevemorse.org/phonetics/bmpm.htm on Jan. 9, 2016.*

(Continued)

*Primary Examiner* — Wei Zhen
*Assistant Examiner* — Andrew M Lyons
(74) *Attorney, Agent, or Firm* — Schwegman Lundberg & Woessner, P.A.

(57) ABSTRACT

Generally discussed herein are systems, apparatuses, or methods for preprocessor directive symbol definition and preprocessor directive symbol usage analysis. In one or more embodiments a method can include applying a heuristic to a first preprocessor directive symbol from a build file or sub-build file of one or more build files or source code files and a second preprocessor directive symbol from a source code file. The method can include determining a likelihood that the first preprocessor directive symbol is presented erroneously in the source code file as the second preprocessor directive symbol based on a result of applying the heuristic.

14 Claims, 6 Drawing Sheets

(56) References Cited

U.S. PATENT DOCUMENTS

| | | | | |
|---|---|---|---|---|
| 8,015,554 B2* | 9/2011 | Varma | G06F 8/51 | 717/137 |
| 8,099,721 B2* | 1/2012 | Miceli | G06F 8/423 | 712/234 |
| 8,122,440 B1* | 2/2012 | Lentini | G06F 8/433 | 717/140 |
| 8,341,520 B2* | 12/2012 | Iakobashvili | G06F 17/273 | 715/257 |
| 8,364,470 B2* | 1/2013 | Abraham | G06F 17/2765 | 704/10 |
| 8,468,160 B2* | 6/2013 | Hassanzadeh | G06F 17/2785 | 707/748 |
| 8,495,591 B2* | 7/2013 | Miceli | G06F 8/423 | 712/234 |
| 8,612,213 B1* | 12/2013 | Zhai | G06F 17/24 | 704/251 |
| 8,621,344 B1* | 12/2013 | Shazeer | G06F 17/273 | 715/257 |
| 9,122,489 B1* | 9/2015 | Vanderpool | G06F 8/427 | |
| 9,361,119 B1* | 6/2016 | Lin | G06F 9/4401 | |
| 2004/0117780 A1* | 6/2004 | Sea | G06F 8/423 | 717/159 |
| 2005/0091525 A1* | 4/2005 | Snover | G06F 21/53 | 726/27 |
| 2006/0130021 A1* | 6/2006 | Plum | G06F 11/3624 | 717/140 |
| 2006/0225052 A1* | 10/2006 | Waddington | G06F 8/51 | 717/136 |
| 2007/0168984 A1* | 7/2007 | Heishi | G06F 8/443 | 717/124 |
| 2008/0098302 A1* | 4/2008 | Roose | G06F 17/273 | 715/257 |
| 2008/0104062 A1* | 5/2008 | Oliver | G06F 17/30985 | |
| 2009/0125873 A1* | 5/2009 | Simon | G06F 8/75 | 717/101 |
| 2009/0144609 A1* | 6/2009 | Liang | G06F 17/21 | 715/230 |
| 2009/0182702 A1* | 7/2009 | Miller | G06F 17/30654 | 706/60 |
| 2009/0313604 A1* | 12/2009 | Miceli | G06F 8/423 | 717/120 |
| 2011/0271253 A1* | 11/2011 | Bnayahu | G06F 8/10 | 717/123 |
| 2012/0030564 A1* | 2/2012 | Grigsby | G06F 17/273 | 715/257 |
| 2013/0060560 A1* | 3/2013 | Mahkovec | G06F 17/273 | 704/9 |
| 2013/0104112 A1* | 4/2013 | Novillo | G06F 8/42 | 717/151 |
| 2013/0152061 A1* | 6/2013 | Golde | G06F 8/427 | 717/143 |
| 2014/0082006 A1* | 3/2014 | Knight | G06F 17/30628 | 707/758 |
| 2014/0109067 A1* | 4/2014 | Flicker | G06F 8/423 | 717/142 |
| 2014/0130016 A1* | 5/2014 | Menghrajani | G06F 8/437 | 717/124 |
| 2014/0298168 A1* | 10/2014 | Son | G06F 17/273 | 715/257 |
| 2014/0344680 A1* | 11/2014 | Kim | G06F 17/273 | 715/271 |
| 2015/0007139 A1* | 1/2015 | Beauchamp | G06F 11/3664 | 717/124 |
| 2015/0331673 A1* | 11/2015 | Mihalcea | G06F 8/00 | 717/100 |

OTHER PUBLICATIONS

Wikipedia, "Levenshtein distance," Jun. 25, 2014, last retrieved from https://en.wikipedia.org/w/index.php?title=Levenshtein_distance&oldid=614421535 on Jan. 9, 2016.*

Stack Overflow, "C++—Why no warning with '#ifX' when X undefined?" Oct. 29, 2009, edited Nov. 23, 2013, last retrieved from http://stackoverflow.com/questions/1643820/why-no-warning-with-if-x-when-x-undefined on Sep. 16, 2016.*

Vidacs et al., "Combining Preprocessor Slicing with C/C++ Language Slicing," The 16th IEEE International Conference on Program Comprehension, pp. 163-171, 2008.*

"Avoiding #if defined (xxx) typos", [online] bytes.com © 2014. [retrieved Jun. 18, 2014], Retrieved from the Internet: <URL: http://bytes.com/topic/c/answers/910516-avoiding-if-defined-xxx-typos>, (2014), 3 pgs.

"GCC Command-Line Options", [online]. [retrieved on Jun. 18, 2014]. Retrived from the Internet: <URL: http://tigcc.ticalc.org/doc/comopts.html>, (2014), 71 pgs.

"Levenshtein distance", [online]. Wikipedia(r) [retrieved on Sep. 2, 2014]. Retrieved from the Internet: <URL: http://en.wikipedia.org/wiki/Levenshtein_distance>, (2014), 8 pgs.

"Levenshtein distance", [online]. [retrieved on Sep. 2, 2014]. Retrieved from the Internet: <URL: http://xlinux.nist.gov/dads/HTML/Levenshtein.html>, In: *Dictionary of Algorithms and Data Structures*, Vreda Pieterse and Paul E. Black, Eds., Aug. 22, 2012, (2013), 2 pgs.

Levenshtein, V. I., "Binary Codes Capable of Correcting Deletions, Insertions, and Reversals", *Soviet Physics—Doklady*, (1966), 707-710.

Sæbjørnsen, A., et al., "Static Validation of C Preprocessor Macros", *24th IEEE/ACM International Conference on Automated Software Engineering(ASE '09)*, (2009), 149-160.

* cited by examiner

PREPROCESSOR DIRECTIVE SYMBOL ANALYZER DEVICES AND METHODS

TECHNICAL FIELD

Examples generally relate to analyzing preprocessor directive symbol usage, such as to help determine if an error in a directive symbol definition or in a directive symbol usage is present in a compiler build or sub-build file or source code file.

BACKGROUND

A pre-compiler, commonly referred to as a preprocessor, provides an entity drafting code an ability to conditionally compile a section of code if a preprocessor directive symbol is defined or set to a particular value. Such conditional compilation can be advantageous, for example, in coding for different platforms, different versions of software, or software including language dependent code. For example, code designed to be used in Russia can be different than code designed to be used in France. The ability to compile a single set of code for multiple uses can be provided by a preprocessor directive, such as the "#if" preprocessor directive in C. For example, in the code segment:

```
#ifdef USA
    x = code_configured_for_USA( );
#else
    #ifdef RUSSIA
        x = code_configured_for_Russia( );
    #else
        x = code_configured_for_France( );
    #endif
#endif
``` a coder can cause the compiler to compile the "code_configured_for_Russia( )" by defining "RUSSIA" or setting "RUSSIA" to a particular value in a build file or a sub-build file. A pre-compiler has a variety of other applications including directing compilation of different libraries, inclusion of a header file, macro expansion, or line control, among others.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to apparatuses, systems, and methods which analyze preprocessor directive symbol definitions and their usage in code, and determine inconsistencies or potential inconsistencies between the preprocessor directive symbol definition and their corresponding usage in the source code.

The C and C++ programming languages are two of the most commonly used programming languages. Both languages support preprocessor directives, such as source file inclusion (#include), macro definitions (#define), or conditional compilation (#if).

The #define directive defines a name that represents something else (a macro). A preprocessor typically responds to a #define directive by storing the name of the macro together with its definition. When the macro is used in source code, the preprocessor replaces it with its defined value. The #include directive tells the preprocessor to include a particular file's contents as part of the program being compiled. The #if, #ifdef, #ifndef, #elif, #else, and #endif directives allow blocks of code to be either included in or excluded from a program compilation. Other preprocessor directives exist (e.g., #error, #warning, etc.).

Preprocessor directive symbols that contain an error, such as a typographical error, a misspelled directive symbol, or other error, are traditionally not discriminated against by compiler parsing stages, often evade human inspection, and can result in a system runtime error. Devices and methods discussed herein can help avoid an error created by an error in a preprocessor directive symbol.

Set theory is used herein to model the preprocessor directive symbol problem and help define a solution. Set permutations are derived which enumerate four possible relationships between a preprocessor symbol definition and preprocessor symbol usage. The relationships are categorized to represent symbol combinations that can indicate different likelihoods of an error existing in the build file of the code. A transformation measurement (e.g., a distance between a preprocessor directive symbol of a build file and a preprocessor directive symbol in code, a phonetic similarity, or a likelihood determination that a preprocessor directive symbol definition in a build file was intended given a preprocessor directive symbol in code) can be applied, such as to claim, such as with adjustable certainty, that a preprocessor directive symbol contains an error, rather than being an intentionally distinct directive symbol definition or usage.

A variety of compilers invoke source code preprocessing stages prior to compilation, such to perform textual substitution and pre-compilation logic operations. Many of these preprocessors adopt rules that make undefined preprocessor symbols legal. These undefined preprocessor symbols are often used in a source code file. For example, the preprocessor directives "#ifdef" and "#ifndef" derive their logic from symbol definitions, and control conditional compilation based solely on symbol definition presence or absence, regardless of symbol value. Consider the following C configuration build file and source code fragments:

```
/* Build File fragment */
#define LOW_RESOLUTION
/* Source Code fragment */
#ifdef LOW_REZOLUTION
    /* Compile this block of code. */
    results = Low_Resolution_Algorithm (data);
#else
```

-continued

```
/* Compile this alternate block of code. */
    results = High_Resolution_Algorithm (data);
#endif
```

Note the erroneous usage of "LOW_REZOLUTION" in the example source code. The build file is defining "LOW_RESOLUTION", yet the compiler will follow an alternate, and in this case, incorrect path because the source code is using "LOW_REZOLUTION". With existing preprocessor semantics, the preprocessor does not differentiate between intentionally undefined symbols and erroneously spelled symbols. Unlike "regular" programming languages, which enforce variable declaration prior to variable usage, preprocessor statements containing erroneous symbols are not typically detected by formal mechanisms. No prior formal process is known that performs an analysis of preprocessor symbol definition and usage consistency or correctness.

Reference will now be made to the FIGS. to further describe details of embodiments configured to detect errors in preprocessor directive symbol definition or usage. In the FIGS., set notation is used to model the problem and define a solution. A series of set permutations are derived which enumerate four possible relationships between a preprocessor directive symbol referenced in a build file (or a sub-build file) and a preprocessor directive symbol referenced in a source code file. Set permutations are formally categorized. The set permutation can represent directive symbol relationships in increasing likelihood of error. A correction transformation measurement is applied, such as to help claim, with adjustable certainty, that a pair of symbols contains an erroneous spelling, rather than intentionally distinct symbol definitions.

Figure 1:
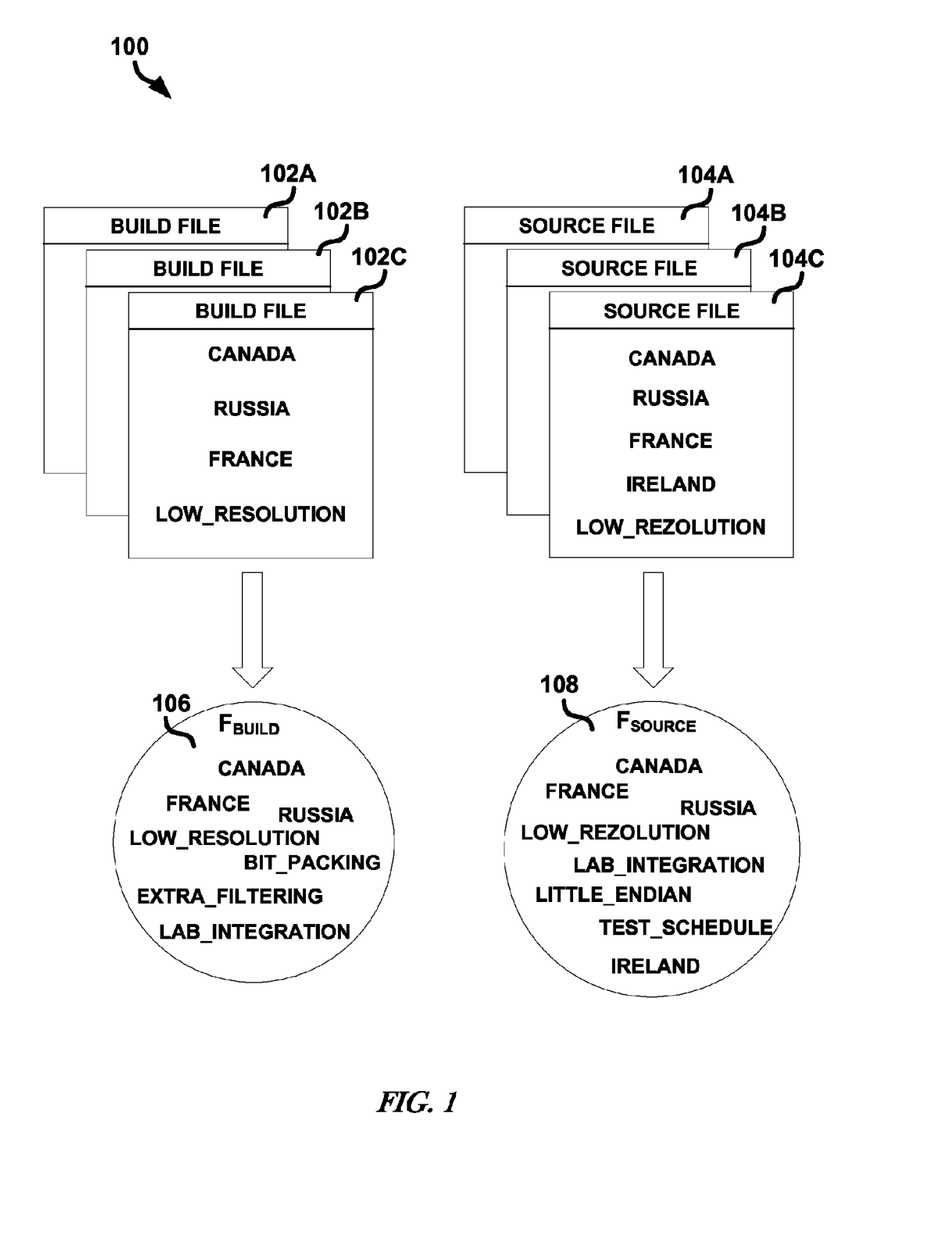
FIG. 1 shows a block diagram of an example of a build file and a source code file, in accord with one or more embodiments.

FIG. 1, shows a block diagram of a system 100 of build files and source code files, in accord with one or more embodiments. The build file 102A, 102B, or 102C can include one or more preprocessor directive symbols defined therein. In the example of FIG. 1, "CANADA", "RUSSIA", "FRANCE", "LOW_RESOLUTION", "BIT_PACKING", "EXTRA_FILTERING", and "LAB_INTEGRATION" are directive symbols that have been defined in the build files 102A-C.

The source code file 104A, 104B, or 104C can include one or more preprocessor directive symbols used therein. In the example of FIG. 1, "CANADA", "RUSSIA", "FRANCE", "LOW_REZOLUTION", "LITTLE_ENDIAN", "TEST_SCHEDULE", "IRELAND", and "LAB_INTEGRATION" are directive symbols that have been used in the source code files 104A-C.

A defined preprocessor directive symbol can be extracted from the build file 102A-C or the source code file 104A-C, such as by scanning the file(s) for a specific symbol or series of symbols that indicate a preprocessor directive symbol. For example, in the C or C++ languages, the symbol "#" indicates a preprocessor directive. When using such a programming language, the text after the directive can be recorded as a preprocessor directive symbol.

Two sets $F_{Build}$ 106 and $F_{Source}$ 108 can be defined. $F_{Build}$ 106 includes directive symbols (e.g., unique directive symbols) defined in a given build file 102A-C together with directive symbols referenced (e.g., recursively referenced) in a sub-build file. $F_{Source}$ 108 and include a directive symbol (e.g., a unique directive symbol) used in a given source code file 104A-C, such as source code files referenced by the given build file 102A-C and sub-build files:

$F_{Build}$={Build File Directive Symbol}

$F_{Source}$={Source Code Directive Symbol Usage}

Four set permutations of the sets $F_{Build}$ and $F_{Source}$ are derived by applying set intersection and set difference operations against the two basic sets $F_{Build}$ and $F_{Source}$.

Figure 2:
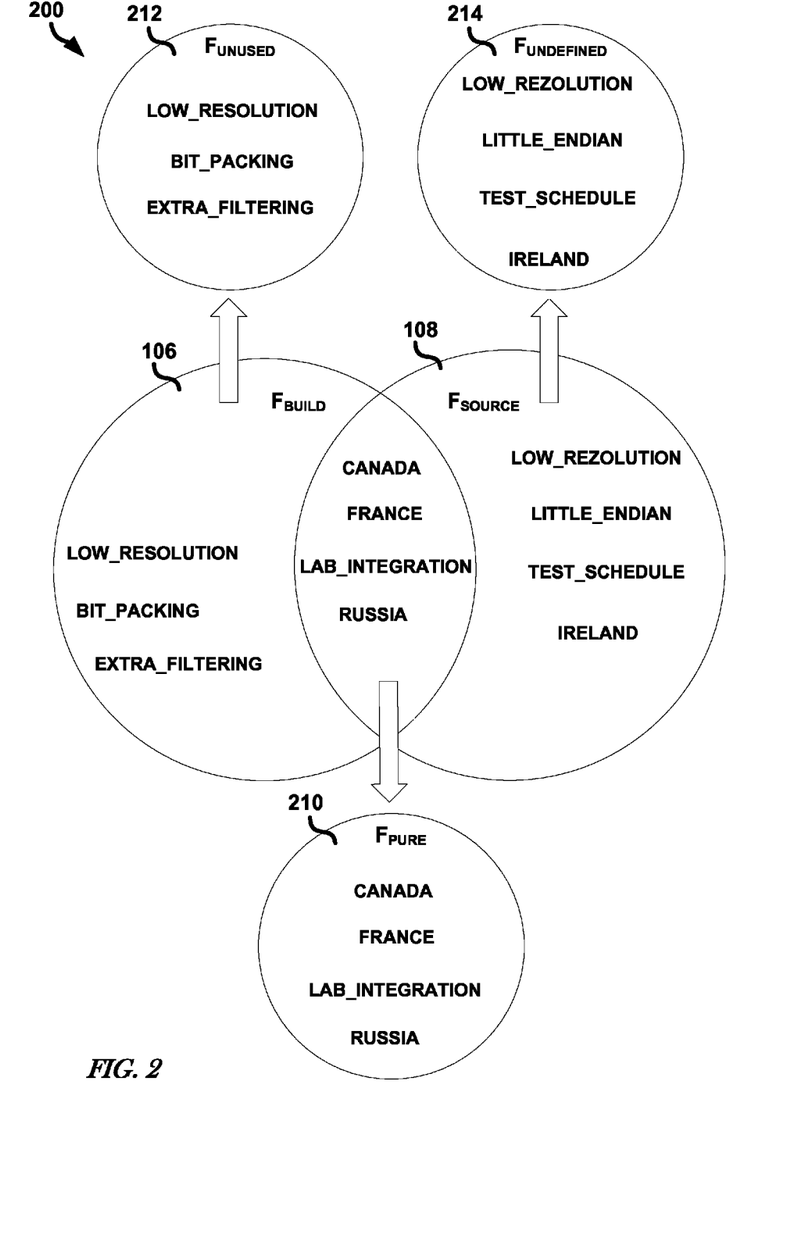
FIG. 2 shows a block diagram of an example of set permutations of processor directive symbols, in accord with one or more embodiments.

FIG. 2 shows a block diagram of a system 200 including three set permutations, in accord with one or more embodiments. One set permutation is the pure intersection set, $F_{Pure}$ 210, which includes elements that represent correctly formed preprocessor directive symbol relationships, where build file directive symbol definitions in $F_{Build}$ and corresponding preprocessor directive symbol usage in $F_{Source}$ possess equality (i.e., the defined directive symbol in the build file is the same as the used directive symbol in the source code):

$F_{Pure}$={$F_{Build} \cap F_{Source}$}

Two of the permutations are discrepancy sets whose elements represent directive symbols defined or used in either $F_{Build}$ or $F_{Source}$, but not present in both. One discrepancy set is the unused directive symbol set, $F_{Unused}$ 212, where directive symbols defined in a build file (i.e. directive symbols present in $F_{Build}$) are absent from the source code file (i.e. directive symbols in $F_{Source}$):

$F_{Unused}$={$F_{Build} \backslash F_{Pure}$}

Another discrepancy set is the undefined set. This set is the converse, with respect to $F_{Unused}$ 212, and is called the undefined directive symbol set, $F_{Undef}$ 214, which includes directive symbols used in a source code file but not defined in a build file:

$F_{Undef}$={$F_{Source} \backslash F_{Pure}$}

Figure 3:
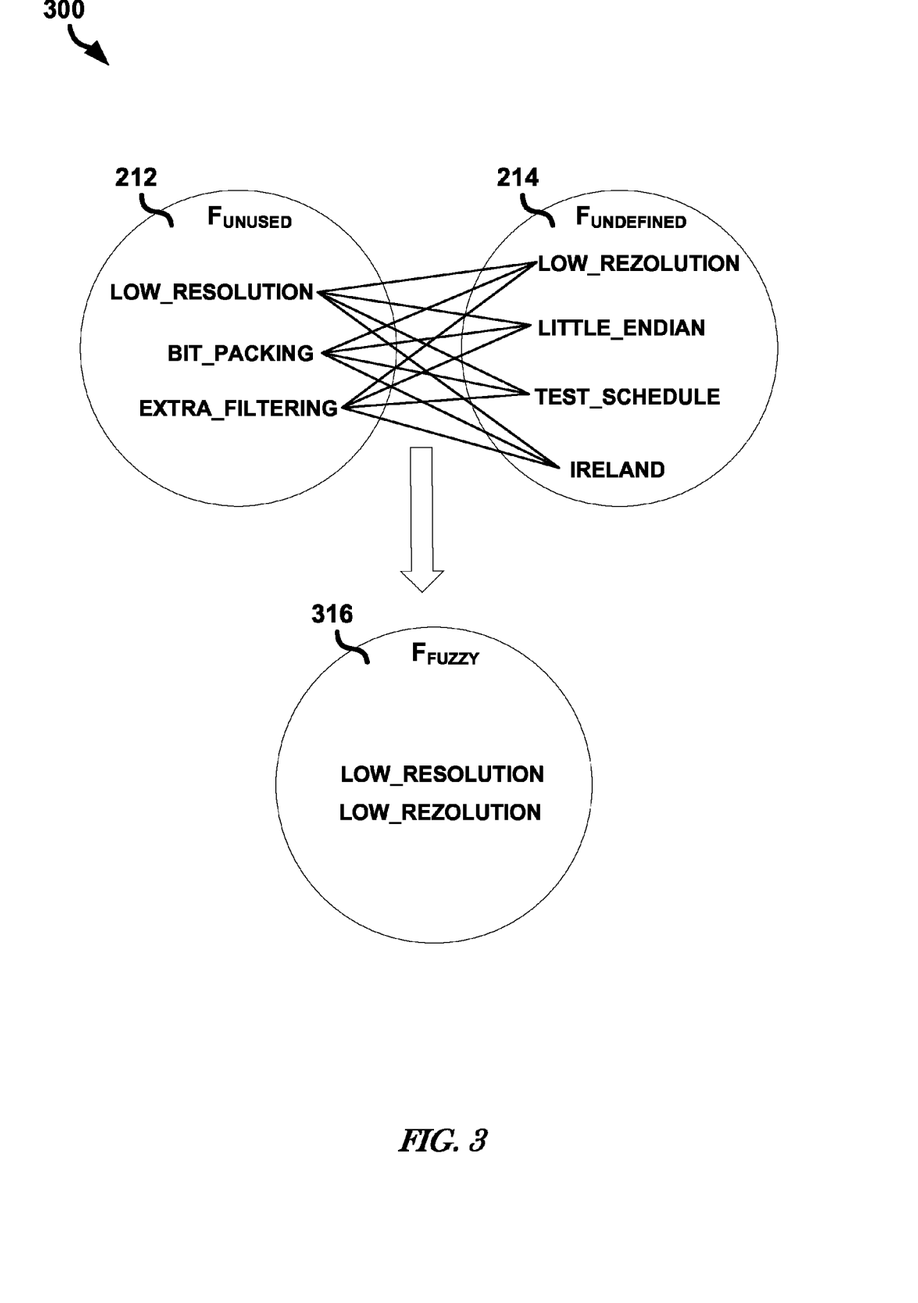
FIG. 3 shows a block diagram of an example of another set permutation of processor directive symbols, in accord with one or more embodiments.

FIG. 3 shows a block diagram of a system 300 including the fourth permutation, in accord with one or more embodiments. The fourth set is called the fuzzy intersection set, $F_{Fuzzy}$ 316, which includes elements that represent elements of discrepancy sets $F_{Unused}$ 212 and $F_{Undef}$ 214, that are different from each other but near enough to one another that they can be considered related, such as can be determined by using some heuristic(s). In one or more embodiments, the members of the $F_{Fuzzy}$ 316 set can be related so as to be considered an error in the build file or the source code. The $F_{Fuzzy}$ 316 set can be created by applying a heuristic to compare an element of the $F_{Unused}$ 212 set to an element of the $F_{Undef}$ 214 set. Each element of $F_{Unused}$ 212 can be compared to each element of $F_{Undef}$ 214 (e.g., by applying the heuristic to each possible pair of elements, one from each set $F_{Unused}$ 212 and $F_{Undef}$ 214), such as indicated by the lines between the elements of the respective sets in FIG. 3. If the heuristic indicates that the element from the $F_{Unused}$ 212 set is sufficiently close to the element from the $F_{Undef}$ 214 set, the elements can be added to the $F_{Fuzzy}$ 316 set (e.g., as a pair). The heuristic can include a phonetic similarity technique, a Hamming distance, a Jaro distance, a Jaro-Winkler distance, a Levenshtein distance, a Damerau-Levenshtein distance technique, or other word similarity technique. The result of applying the heuristic ($H_{Result}$) can be compared to a configurable threshold to determine if the two elements are sufficiently similar to warrant being added to the $F_{Fuzzy}$ 316 set:

$F_{Fuzzy}$={$x:x \in \{F_{Unused} \times F_{Undef}\}$ and
    $H_{Result}$<Threshold}

Errors can be reported, such as by recording, displaying, or communicating the element(s) to a user or personnel responsible for the code. Ideally, $F_{Fuzzy}$ 316 is equal to the empty set, $F_{Fuzzy}=\emptyset$, which represents zero symbol relationship errors originating from basic sets $F_{Build}$ 106 and $F_{Source}$ 108. However, if $F_{Fuzzy}$ 316 contains one or more symbol-pair elements, then a likelihood of errors has been discovered:

$$|F_{Fuzzy}|>0 \Leftrightarrow \text{System Errors}$$

Figure 4:
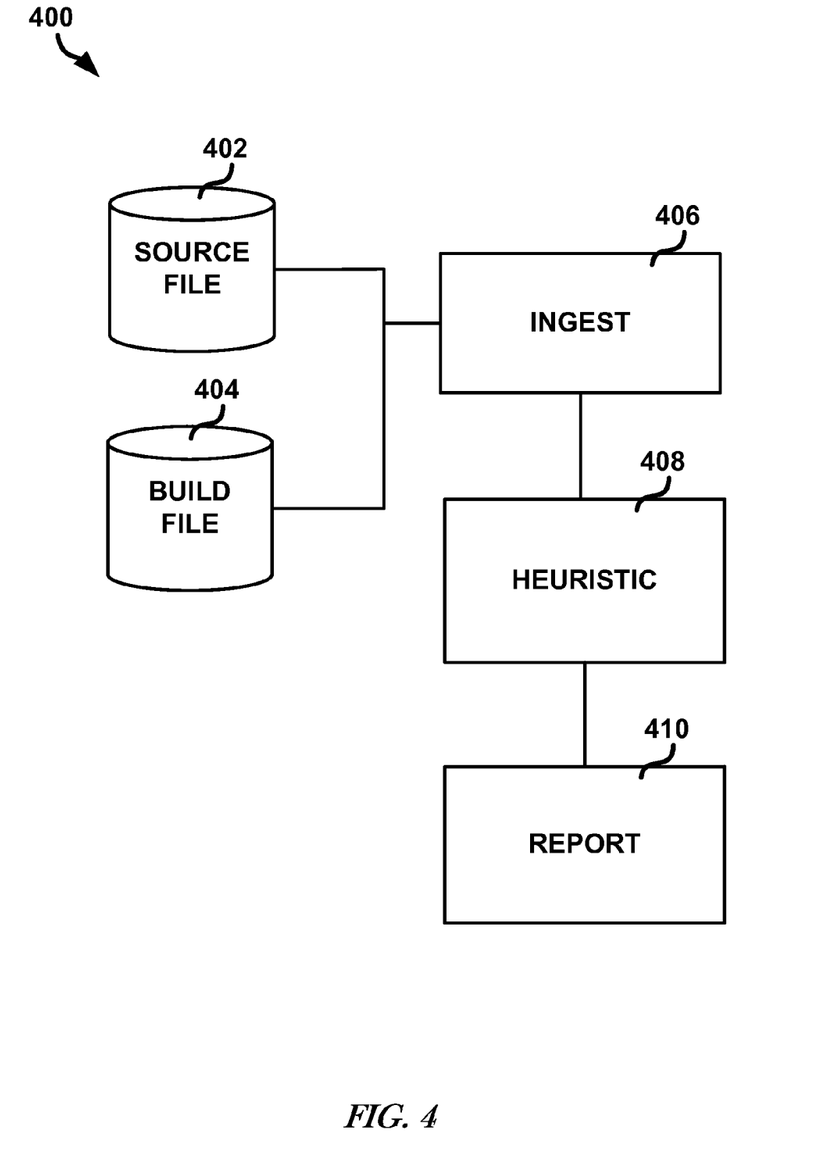
FIG. 4 shows a block diagram of an example of a system, in accord with one or more embodiments.

FIG. 4 illustrates a block diagram of an example of a system 400, in accord with one or more embodiments. The system 400 can include a build file repository 402, a source code file repository 404, an ingest module 406, a heuristic module 408, or a report module 410.

The build file repository 402 can include a memory or a database. The build file repository 402 can include one or more compiler build or sub-build files stored thereon. A sub-build file is a file referred to in a build file and used by a compiler in compiling source code.

The source code file repository 404 can include a memory or a database. The source code file repository 404 can include one or more source code files stored thereon. The source code file can include source code (computer instructions presentable in a human-readable form or translatable into a computer executable form). Note that while FIG. 4 depicts the build file repository 402 and the source code file repository 404 as separate units, they can both be the same unit. That is, source code and build files can be stored on the same repository.

The ingest module 406 can be communicatively coupled (e.g., through a wired or wireless electrical connection) to the build file repository 402 and the source code file repository 404. The ingest module 406 can receive one or more build files or source code files from the build file repository 402 and the source code file repository 404, respectively. The ingest module 406 can determine which preprocessor directive symbols (if any) are defined in a received build file, such as to create $F_{Build}$. The ingest module 406 can determine which preprocessor directive symbols are used in a received source code file, such as to create $F_{Source}$. Alternatively, the ingest module 406 can receive a set of zero or more preprocessor directive symbols defined in a build file (or a sub-build file) (e.g., $F_{Build}$) and a set of zero or more preprocessor directive symbols defined in a corresponding source code file (e.g., $F_{Source}$). The ingest module 406 can be configured to compare $F_{Build}$ and $F_{Source}$, such as to create $F_{Pure}$, $F_{Unused}$, or $F_{Undef}$ as discussed herein.

The heuristic module 408 can be communicatively coupled (e.g., through a wired or wireless electrical connection) to the ingest module 406. The heuristic module 408 can be configured to apply a heuristic, such as a Hamming distance technique, Levenshtein distance technique, Damerau-Levenshtein distance, approximate string matching technique (e.g., fuzzy string searching), Jaro distance technique (e.g., Jaro-Winkler distance technique) or a phonetic similarity or matching technique, to preprocessor directive symbols (e.g., preprocessor directive symbols in the build file (or sub-build file) and not in the source code file or vice versa, such as preprocessor directive symbols in $F_{Unused}$ or in $F_{Undef}$). A result from applying the heuristic can be used to determine a likelihood that a directive symbol from a build file is erroneously present as a different directive symbol in a source code file. In one or more embodiments, the likelihood can indicate a probability that the preprocessor directive symbol was used in the source code file, but the preprocessor directive symbol defined in the build file was intended. The heuristic module 408 can compare the result from applying the heuristic to a threshold, such as to determine whether it is likely that the directive symbol is erroneously presented in a source code file.

In one or more embodiments, the heuristic module 408 can be configured to apply a phonetic matching or similarity technique (e.g., on pairs of directive symbols). The heuristic module 408 can compare phonetic codes created using the phonetic matching technique, such as to determine a likelihood that a directive symbol in the source file is erroneously used (e.g., present). Phonetic matching techniques include techniques for organizing words by their pronunciation. Some phonetic techniques include Soundex, Metaphone, and Double Metaphone, among others. Generally, phonetic techniques operate by taking a set of characters (e.g., a word or a preprocessor directive symbol) as an input and creating a code as function of the input such that words that have the same or similar codes can correspond to sets of characters that are phonetically similar.

In one or more embodiments, the heuristic module 408 can be configured to apply a Levenshtein distance technique (e.g., a Damerau-Levenshtein distance), Jaro-Winkler distance technique, or Hamming distance technique to two or more directive symbols and compare a result of applying the technique to a threshold distance, such as to determine a likelihood that a directive symbol in the source file is erroneously present. The threshold distance can be predefined. The threshold distance can be configured to increase or decrease the likelihood that a directive symbol from the source code file is considered erroneously presented. By increasing the allowable distance between strings a likelihood that an error in preprocessor directive symbol usage is found. Note that using some techniques a higher resulting distance number can mean that the presented symbols are more closely related, while in others a smaller resulting distance number can mean that the presented symbols are more closely related.

The Hamming distance technique returns, generally, a number of character substitutions it would take to turn one string into another string of equal length. The Levenshtein distance technique returns, generally, a number of single character edits (insertion, deletion, or substitution) it would take to turn one string (e.g., preprocessor directive symbol) into another string. The result of applying a Levenshtein distance technique can be the number of such single character edits. The Damerau-Levenshtein distance is similar to the Levenshtein distance but also counts transpositions of adjacent characters in its calculated distance.

The Jaro distance technique and the Jaro-Winkler distance technique return, generally, a normalized similarity score between two strings. The normalized score is usually a number between zero and one. The closer the normalized score is to one, the more similar the strings are, with a return score of one corresponding to identity and zero corresponding to no similarity. The defined threshold can be a number of edits (e.g., in the case of a Hamming, Levenshtein, or Damerau-Levenshtein technique) or a normalized score (e.g., in the case of a Jaro distance technique or a Jaro-Winkler distance technique).

The report module 410 can be communicatively coupled to the heuristic module 408. The report module 410 can receive an indication from the heuristic module 408 as to whether the result is greater than (or equal to), equal to, or less than (or equal to) the threshold value, or whether or not there is a sufficient likelihood that the preprocessor directive symbol in the source code is erroneously present (e.g., includes a typographical, transposition, or other error). The report module 410 can be configured to provide a communication, such as to a user, indicating that an error is or is not likely to be present in the source code file (or build file) preprocessor directive symbol used (or defined).

Figure 5:
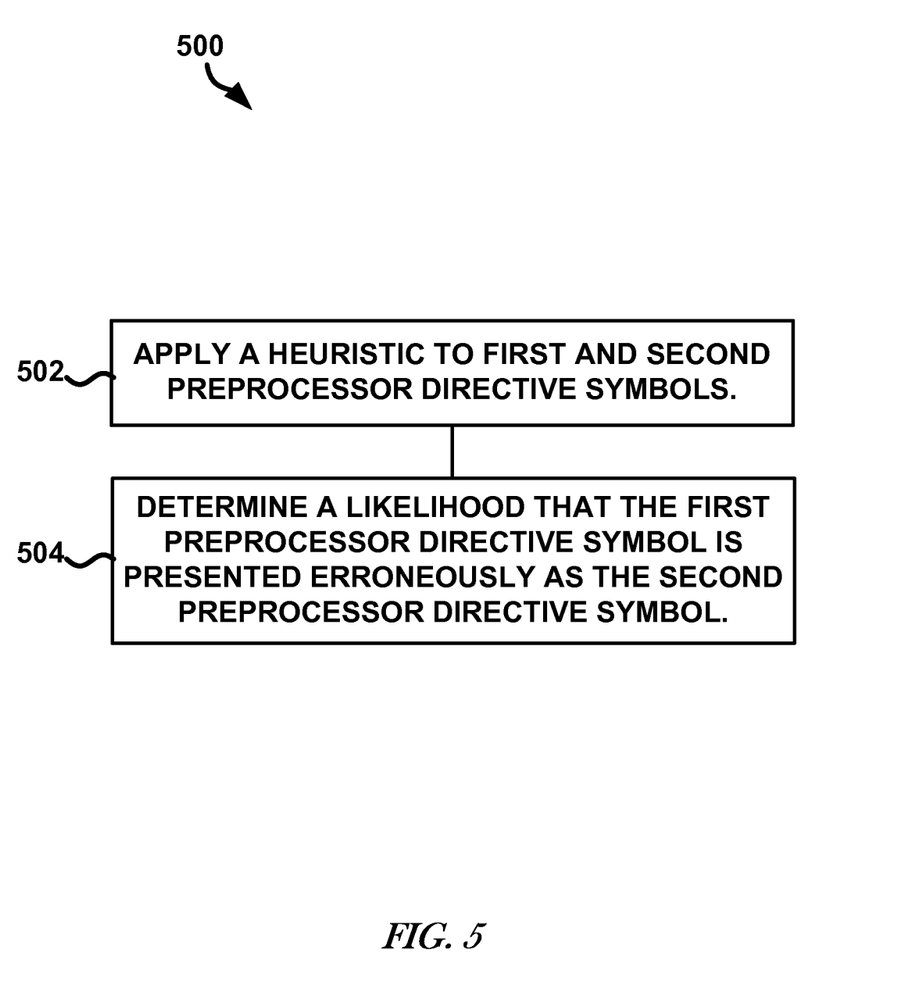
FIG. 5 shows a block diagram of an example of a method, in accord with one or more embodiments.

FIG. 5 illustrates a flow diagram of a method 500, in accord with one or more embodiments. The method 500 as illustrated includes: applying a heuristic to first and second preprocessor directive symbols at operation 502; and determining a likelihood that the first preprocessor directive symbol is presented erroneously as the second preprocessor directive symbol at operation 504. The first preprocessor directive symbol can be a symbol defined in a build file or a sub-build file. The second preprocessor directive symbol can be a symbol used in a source code file corresponding to the build or sub-build file. The likelihood can be determined based on a result of applying the heuristic.

The method 500 can include creating a first set of one or more preprocessor directive symbols. The first set can include preprocessor directive symbols defined in one or more build files or sub-build files, (e.g., $F_{Build}$ or $F_{Unused}$ as discussed herein). The method 500 can include creating a second set of one or more preprocessor directive symbols. The second set including preprocessor directive symbols used in one or more source code files (e.g., $F_{Source}$ or $F_{Undef}$ as discussed herein).

The method 500 can include comparing the determined likelihood to a threshold value. The method 500 can include reporting the directive symbol in the second set is likely erroneously present in the source code file as the second directive symbol in response to determining the determined likelihood is less than (or equal to) than the threshold value. The heuristic can include a Jaro-Winkler distance, Hamming distance, Levenshtein distance, or a phonetic matching technique, among others.

The operation at 502 can include applying the phonetic matching technique on the first and second directive symbols. The operation at 502 can include applying the Levenshtein distance to the first and second directive symbols.

The operation at 504 can include comparing codes of the first and second directive symbols created using the phonetic matching technique. The operation at 504 can include comparing a result of applying the Levenshtein distance to a threshold distance.

The method 500 can include reporting that it is likely that the second, different directive symbol is erroneously present in the source code file in response to determining that the result is less than (or equal to) the threshold.

Figure 6:
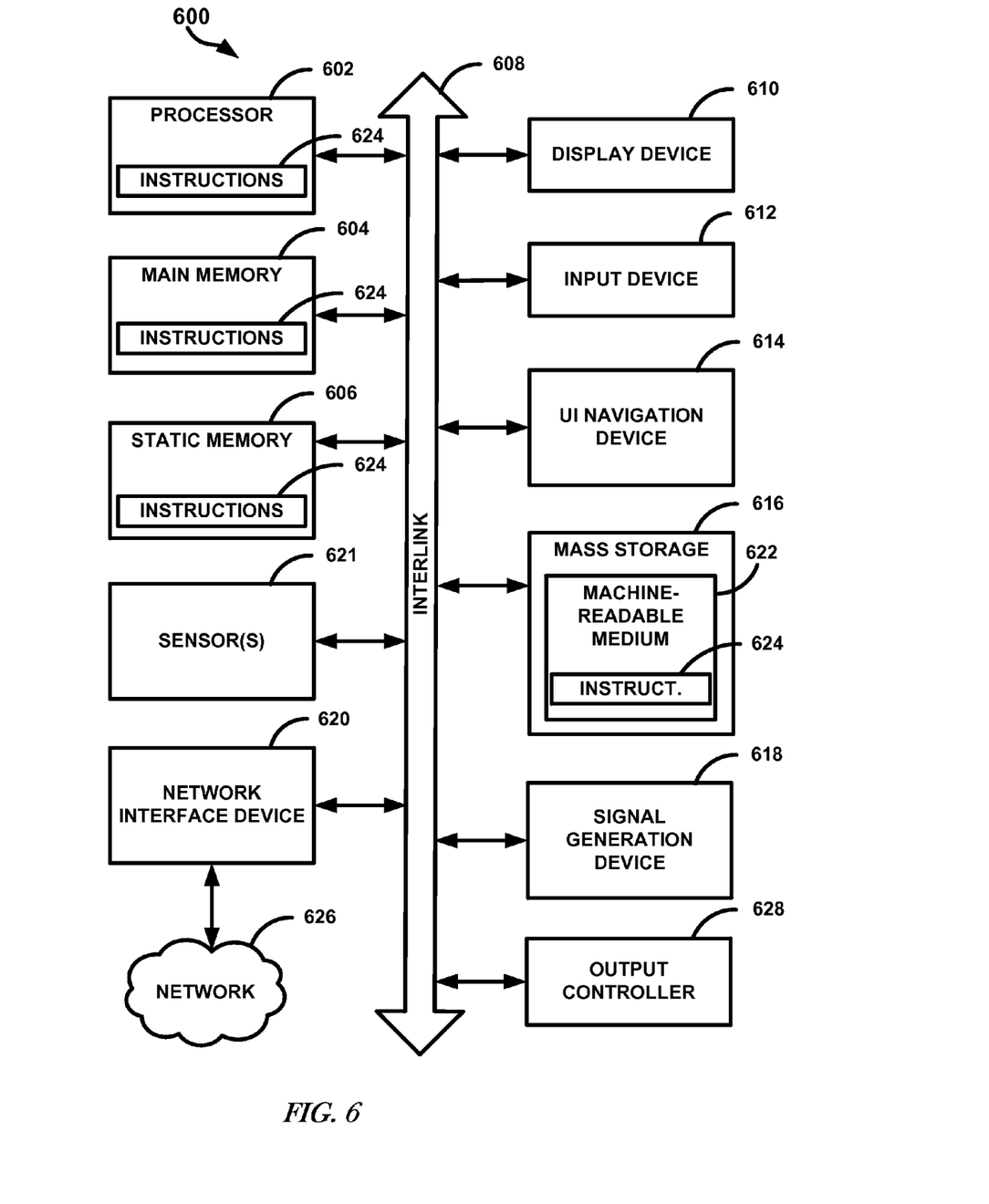
FIG. 6 shows a block diagram of an example of a machine upon which any of one or more processes (e.g., methods) discussed herein can be performed.

FIG. 6 illustrates a block diagram of an example machine 600 upon which any one or more of the process (e.g., methodologies) discussed herein can perform. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 600 can include a hardware processor 602 (e.g., a central processing unit (CPU), a graphics processing unit (GPU), a hardware processor core, or any combination thereof), a main memory 604 and a static memory 606, some or all of which can communicate with each other via an interlink (e.g., bus) 608. The machine 600 can further include a display unit 610, an alphanumeric input device 612 (e.g., a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine readable medium 622 on which is stored one or more sets of data structures or instructions 624 (e.g., software) embodying or utilized by any one or more of the process or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute machine readable media.

While the machine readable medium 622 is illustrated as a single medium, the term "machine readable medium" can include a single medium or multiple media (e.g., a centralized or distributed database, and/or associated caches and servers) configured to store the one or more instructions 624.

The term "machine readable medium" can include any medium that is capable of storing, encoding, or carrying instructions for execution by the machine 600 and that cause the machine 600 to perform any one or more of the processes of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 can further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) process. The term "transmission medium" shall be taken to include any intangible medium that is capable of storing, encoding or carrying instructions for execution by the machine 600, and includes digital or analog communications signals or other intangible medium to facilitate communication of such software.

While C preprocessor directive symbol definition and usage constructs are used as illustrative examples herein, other languages, such as ADA, C++, and other coding languages, can use other directive or directive symbol constructs with different spellings or behavior.

EXAMPLES AND NOTES

The present subject matter can be described by way of several examples.

Example 1 can include or use subject matter (such as an apparatus, a method, a means for performing acts, or a device readable memory including instructions that, when performed by the device, can cause the device to perform acts), such as can include or use applying a heuristic to a first preprocessor directive symbol from a build file or sub-build file of one or more build files or source code files and a second preprocessor directive symbol from a source code file, and determining a likelihood that the first preprocessor directive symbol is presented erroneously in the source code file as the second preprocessor directive symbol based on a result of applying the heuristic.

Example 2 can include or use, or can optionally be combined with the subject matter of Example 1, to include or use creating a first set of one or more preprocessor directive symbols, the first set including preprocessor directive symbols defined in one or more build files or sub-build files, wherein the one or more build files or sub-build files include the build file or the sub-build file, creating a second set of one or more preprocessor directive symbols, the second set including preprocessor directive symbols used in one or more source code files, wherein the one or more source code files include the source code file, and wherein the first directive symbol is a member of the first set and the second directive symbol is a member of the second set.

Example 3 can include or use, or can optionally be combined with the subject matter of at least one of Examples 1-2, to include or use comparing the determined likelihood to a threshold value, and reporting the first preprocessor directive symbol is likely presented erroneously in the source code file as the second directive symbol in response to determining the determined likelihood is less than the threshold value.

Example 4 can include or use, or can optionally be combined with the subject matter of at least one of Examples 1-3, to include or use, wherein applying the heuristic includes applying at least one of a Jaro distance, Jaro-Winkler, Hamming distance, Levenshtein distance, Damerau-Levenshtein distance, or a phonetic matching technique.

Example 5 can include or use, or can optionally be combined with the subject matter of at least one of Examples 1-4, to include or use, wherein applying the heuristic includes applying the phonetic matching technique on the first and second directive symbols and determining the likelihood that a first directive symbol from a build file or sub-build file is erroneously present as a second, different directive symbol in a source code file includes comparing codes of the first and second directive symbols created using the phonetic matching technique.

Example 6 can include or use, or can optionally be combined with the subject matter of at least one of Examples 1-4, to include or use, wherein applying the heuristic includes applying the Levenshtein distance to the first and second directive symbols and the method further comprises comparing a result of applying the Levenshtein distance to a threshold distance, and reporting that it is likely that the second, different directive symbol is presented erroneously in the source code file as the second preprocessor directive symbol in response to determining that the result is less than (or equal to) the threshold.

Example 7 can include or use, or can optionally be combined with the subject matter of at least one of Examples 1-6, to include or use, wherein the first preprocessor directive symbol is not used in the source code and the second preprocessor directive symbol is not defined in the build file or sub-build file.

Example 8 can include or use subject matter (such as an apparatus, a method, a means for performing acts, or a device readable memory including instructions that, when performed by the device, can cause the device to perform acts), such as can include or use an ingest module to receive a first preprocessor directive symbol defined in a build file or a sub-build file and receive a second preprocessor directive symbol used in a source code file, and a heuristic module coupled to the ingest module to apply a heuristic to the first and second directive symbols and determine a likelihood that the first preprocessor directive symbol is presented erroneously as the second directive symbol in the source code file based on a result of applying the heuristic.

Example 9 can include or use, or can optionally be combined with the subject matter of Example 8, to include or use, wherein the ingest module is configured to receive one or more build files or sub-build files and create a first set of one or more preprocessor directive symbols, the first set including preprocessor directive symbols defined in one the more build files or sub-build files, wherein the one or more build files or sub-build files include the build file or the sub-build file, and receive one or more source code files and create a second set of one or more preprocessor directive symbols, the second set including directive symbols used in the one or more source code files, wherein the one or more source code files include the source code file, and wherein the first directive symbol is a member of the first set and the second directive symbol is a member of the second set.

Example 10 can include or use, or can optionally be combined with the subject matter of at least one of Examples 8-9, to include or use, wherein the heuristic module is configured to compare the determined likelihood to a threshold value, and the system further comprises a report module coupled to the heuristic module to report that the first preprocessor directive symbol is likely presented erroneously in the source code file as the second preprocessor directive symbol in response to the heuristic module determining the determined likelihood is less than the threshold value.

Example 11 can include or use, or can optionally be combined with the subject matter of at least one of Examples 8-10, to include or use, wherein the heuristic module is configured to apply at least one of a Jaro distance, Jaro-Winkler distance, Hamming distance, Levenshtein distance, Damerau-Levenshtein distance, or a phonetic matching technique to the first and second preprocessor directive symbols.

Example 12 can include or use, or can optionally be combined with the subject matter of at least one of Examples 8-11, to include or use, wherein the heuristic module is configured to apply the phonetic matching technique on the first and second preprocessor directive symbols and compare codes of the first and second preprocessor directive symbols created using the phonetic matching technique.

Example 13 can include or use, or can optionally be combined with the subject matter of at least one of Examples 8-11, to include or use, wherein heuristic module is configured to apply the Levenshtein distance technique to the first and second preprocessor directive symbols and compare a result of applying the Levenshtein distance to a threshold distance, and the system comprises a report module configured to report that it is likely that the second preprocessor directive symbol is presented erroneously in the source code file in response to determining that the result is less than (or equal to) the threshold.

Example 14 can include or use, or can optionally be combined with the subject matter of at least one of Examples 8-13, to include or use, wherein the first preprocessor directive symbol is not used in the one or more source code files and the second preprocessor directive symbol is not defined in the one or more build files or sub-build files.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or process described herein can be implemented in software or a combination of software and human implemented procedures. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means or, in the non-exclusive sense discussed in the previous paragraph, of all elements within the range indicated by the dash. For example, 103A-B means a nonexclusive or of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for determining if a user typed one preprocessor directive symbol but intended to type another preprocessor directive symbol, the method comprising:

creating a set of defined preprocessor directive symbols including unique preprocessor directive symbols defined in one or more build or sub-build files of a software program, creating the set of defined preprocessor directive symbols including analyzing the one or more build or sub-build files for a preprocessor directive and recording symbols immediately following the preprocessor directive as a defined preprocessor directive symbol in the set of defined preprocessor directive symbols;

creating a set of used preprocessor directive symbols including unique preprocessor directive symbols defined in one or more source code files of the software program, creating the set of used preprocessor directive symbols including analyzing the one or more source code files for the preprocessor directive and recording symbols immediately following the preprocessor directive as a used preprocessor directive symbol in the set of used preprocessor directive symbols;

creating a set of accurately used preprocessor directive symbols that includes only preprocessor directive symbols in the set of used preprocessor directive symbols and the set of defined preprocessor directive symbols;

creating a set of unused preprocessor directive symbols that includes preprocessor directive symbols in the set of defined preprocessor directive symbols and not in the set of used preprocessor directive symbols by including preprocessor directive symbols in the set of defined preprocessor directive symbols and not in the set of accurately used preprocessor directive symbols in the set of unused preprocessor directive symbols;

creating a set of undefined preprocessor directive symbols that includes preprocessor directive symbols in the set of used preprocessor directive symbols and not in the set of defined preprocessor directive symbols by including preprocessor directive symbols in the set of used preprocessor directive symbols and not in the set of accurately used preprocessor directive symbols in the set of undefined preprocessor directive symbols;

identifying a preprocessor directive symbol that is in the set of unused preprocessor directive symbols;

comparing the identified preprocessor directive symbol to each preprocessor directive symbol in the set of undefined preprocessor directive symbols by respectively applying a heuristic to the identified preprocessor directive symbol and each preprocessor directive symbol from the set of undefined preprocessor directive symbols;

determining a likelihood that the identified preprocessor directive symbol is presented erroneously as a respective preprocessor directive symbol of the set of undefined preprocessor directive symbols based on a result of applying the heuristic;

comparing each determined likelihood to a threshold value; and providing a warning in response to a determined likelihood being greater than the determined threshold.

2. The method of claim 1, wherein applying the heuristic includes applying at least one of a Jaro distance, Jaro-Winkler, Hamming distance, Levenshtein distance, Damerau-Levenshtein distance, or a phonetic matching technique.

3. The method of claim 2, wherein applying the heuristic includes applying the phonetic matching technique on the unused and undefined preprocessor directive symbols and determining the likelihood that the identified preprocessor directive symbol is erroneously present as the respective preprocessor directive symbols of the set of undefined preprocessor directive symbols includes comparing codes of the identified defined and identified used preprocessor directive symbols created using the phonetic matching technique.

4. The method of claim 2, wherein applying the heuristic includes applying the Levenshtein distance to the respective preprocessor directive symbols in the set of unused preprocessor directive symbols and the set of undefined preprocessor directive symbols.

5. A system comprising:

an ingest module comprising one or more circuits to:

create a set of defined preprocessor directive symbols including unique preprocessor directive symbols defined in one or more build or sub-build files of a software program, creating the set of defined preprocessor directive symbols including analyzing the one or more build or sub-build files for a preprocessor directive and recording symbols immediately following the preprocessor directive as a defined preprocessor directive symbol in the set of defined preprocessor directive symbols;

create a set of used preprocessor directive symbols including unique preprocessor directive symbols defined in one or more source code files of the software program, creating the set of used preprocessor directive symbols including analyzing the one or more source code files for the preprocessor directive and recording symbols immediately following the preprocessor directive as a used preprocessor directive symbol in the set of used preprocessor directive symbols;

create a set of accurately used preprocessor directive symbols that includes only preprocessor directive symbols in the set of used preprocessor directive symbols and the set of defined preprocessor directive symbols;

create a set of unused preprocessor directive symbols that includes preprocessor directive symbols in the set of defined preprocessor directive symbols and not in the set of used preprocessor directive symbols by including preprocessor directive symbols in the set of defined preprocessor directive symbols and not in the set of accurately used preprocessor directive symbols in the set of unused preprocessor directive symbols;

create a set of undefined preprocessor directive symbols that includes preprocessor directive symbols in the set of used preprocessor directive symbols and not in the set of defined preprocessor directive symbols by including preprocessor directive symbols in the set of used preprocessor directive symbols and not in the set of accurately used preprocessor directive symbols in the set of undefined preprocessor directive symbols;

identify a preprocessor directive symbols that is in the set of unused preprocessor directive symbols; and a heuristic module comprising one or more circuits coupled to the ingest module to compare the identified preprocessor directive symbol to each preprocessor directive symbol in the set of undefined preprocessor directive symbols by respectively applying a heuristic to the identified preprocessor directive symbol and each preprocessor directive from the set of undefined preprocessor directive symbols, and determine a likelihood that the identified defined preprocessor directive symbol is presented erroneously as a respective preprocessor directive symbols of the set of undefined preprocessor directive symbols based on a result of applying the heuristic.

6. The system of claim 5, wherein the one or more circuits of the heuristic module are configured to compare the determined likelihood to a threshold value, and the system further comprises:

a report module including one or more circuits coupled to the heuristic module to report that the undefined preprocessor directive symbol is likely presented erroneously in the source code file as the unused preprocessor directive symbol in response to the one or more circuits of the heuristic module determining the determined likelihood is less than the threshold value.

7. The system of claim 5, wherein the one or more circuits of the heuristic module are further configured to apply at least one of a Jaro distance, Jaro-Winkler distance, Hamming distance, Levenshtein distance, Damerau-Levenshtein distance, or a phonetic matching technique to the identified preprocessor directive symbol and respective preprocessor directive symbols in the set of undefined preprocessor directive symbols.

8. The system of claim 7, wherein the one or more circuits of the heuristic module are further configured to apply the phonetic matching technique on the identified preprocessor directive symbol and respective preprocessor directive symbols in the set of undefined preprocessor directive symbols and compare codes of the identified preprocessor directive symbol and respective preprocessor directive symbols in the set of undefined preprocessor directive symbols created using the phonetic matching technique.

9. The system of claim 7, wherein the one or more circuits of the heuristic module are further configured to apply the Levenshtein distance technique to the identified preprocessor directive symbol and respective preprocessor directive symbols in the set of undefined preprocessor directive symbols and compare a result of applying the Levenshtein distance to a threshold distance; and the system comprising a report module including one or more circuits configured to report that it is likely that the identified preprocessor directive symbol is presented erroneously in the source code file in response to determining that the result is less than the threshold.

10. A non-transitory computer readable storage device including instructions stored thereon, which when executed by a machine, configure the machine to:

create a set of defined preprocessor directive symbols including unique preprocessor directive symbols defined in one or more build or sub-build files of a software program, creating the set of defined preprocessor directive symbols including analyzing the one or more build or sub-build files for a preprocessor directive and recording symbols immediately following the preprocessor directive as a defined preprocessor directive symbol in the set of defined preprocessor directive symbols;

create a set of used preprocessor directive symbols including unique preprocessor directive symbols defined in one or more source code flies of the software program, creating the set of used preprocessor directive symbols including analyzing the one or more source code files for the preprocessor directive and recording symbols immediately following the preprocessor directive as a used preprocessor directive symbol in the set of used preprocessor directive symbols;

create a set of accurately used preprocessor directive symbols that includes only preprocessor directive symbols in the set of used preprocessor directive symbols and the set of defined preprocessor directive symbols;

create a set of unused preprocessor directive symbols that includes preprocessor directive symbols in the set of defined preprocessor directive symbols and not in the set of used preprocessor directive symbols by including preprocessor directive symbols in the set of defined preprocessor directive symbols and not in the set of accurately used preprocessor directive symbols in the set of unused preprocessor directive symbols;

create a set of undefined preprocessor directive symbols that includes preprocessor directive symbols in the set of used preprocessor directive symbols and not in the set of defined preprocessor directive symbols by including preprocessor directive symbols in the set of used preprocessor directive symbols and not in the set of accurately used preprocessor directive symbols in the set of undefined preprocessor directive symbols;

identify a preprocessor directive symbol that is in the set of unused preprocessor directive symbols;

comparing the identified preprocessor directive symbol to each preprocessor directive symbol in the set of undefined preprocessor directive symbols by respectively applying a heuristic to the identified preprocessor directive symbol and each preprocessor directive symbol from the set of undefined preprocessor directive symbols; and determine a likelihood that the identified preprocessor directive symbol is presented erroneously as respective preprocessor directive symbol of the set of undefined preprocessor directive symbols based on a result of applying the heuristic.

11. The storage device of claim 10, further comprising instructions, which when executed by the machine, configure the machine to:

compare the determined likelihood to a threshold value; and report the identified preprocessor directive symbol is likely presented erroneously in the source code file as the respective preprocessor directive symbol in response to determining the determined likelihood is less than the threshold value.

12. The storage device of claim 10, wherein the instructions that configure the machine to apply the heuristic include instructions, which when executed by the machine, configured the machine to apply at least one of a Hamming distance technique, Levenshtein distance technique, Damerau-Levenshtein distance technique, Jaro distance technique, Jaro-Winkler distance technique, or a phonetic matching technique to the identified preprocessor directive symbol and respective preprocessor directive symbols in the set of undefined preprocessor directive symbols.

13. The storage device of claim 12, wherein the instructions that configure the machine to apply the heuristic include instructions, which when executed by the machine, configure the machine to apply the phonetic matching technique on the identified preprocessor directive symbol and respective preprocessor directive symbols in the set of undefined preprocessor directive symbols and wherein the instructions that configure the machine to determine the likelihood that the identified preprocessor directive symbol is erroneously presented as the respective preprocessor directive symbol of the set of undefined preprocessor directive symbols include instructions, which when executed by the machine, configure the machine to compare codes corresponding to the identified preprocessor directive symbol and respective preprocessor directive symbols in the set of undefined preprocessor directive symbols created using the phonetic matching algorithm.

14. The storage device of claim 12, wherein:
the instructions that configure the machine to apply the heuristic include instructions, which when executed by the machine, configure the machine to apply the Levenshtein distance to the identified preprocessor directive symbol and respective preprocessor directive symbols in the set of undefined preprocessor directive symbols;
the instructions that configure the machine to determine a likelihood that identified preprocessor directive symbol is presented erroneously as the respective preprocessor directive symbol include instructions, which when executed by the machine, configure the machine to compare a result of applying the Levenshtein distance to a threshold distance; and
the instructions, further comprise instructions, which when executed by the machine, configure the machine to report that it is likely that the identified preprocessor directive symbol is erroneously presented in response to determining that the result is less than the threshold.

* * * * *

UNITED STATES PATENT AND TRADEMARK OFFICE
CERTIFICATE OF CORRECTION

PATENT NO. : 9,558,101 B2  
APPLICATION NO. : 14/455328  
DATED : January 31, 2017  
INVENTOR(S) : David S. Galvin Page 1 of 1

It is certified that error appears in the above-identified patent and that said Letters Patent is hereby corrected as shown below:

On the Title Page

On page 2, in Column 2, under "Other Publications", Line 16, delete "Retrived" and insert --Retrieved-- therefor Signed and Sealed this
Seventeenth Day of April, 2018

Andrei Iancu
*Director of the United States Patent and Trademark Office*